United States Patent [19]

Hoyer et al.

[11] Patent Number: 4,485,041

[45] Date of Patent: Nov. 27, 1984

[54] WATER-SOLUBLE METAL FREE OR COPPER TRIAZINO-BIS-[HYDROXY-NAPH-THYLAMINO]-DISAZO DYESTUFFS CONTAINING FIBER REACTIVE GROUPS, AND A PROCESS FOR DYEING OR PRINTING CELLULOSE FIBERS

[75] Inventors: Ernst Hoyer; Fritz Meininger, both of Frankfurt am Main; Rudolf Fass, Kelkheim, all of Fed. Rep. of Germany

[73] Assignee: Hoechst Aktiengesellschaft, Frankfurt am Main, Fed. Rep. of Germany

[21] Appl. No.: 234,966

[22] Filed: Feb. 17, 1981

Related U.S. Application Data

[63] Continuation of Ser. No. 76,755, Sep. 18, 1979, abandoned, which is a continuation of Ser. No. 956,409, Oct. 31, 1978, abandoned.

[30] Foreign Application Priority Data

Nov. 2, 1977 [DE] Fed. Rep. of Germany ....... 2748965

[51] Int. Cl.$^3$ .................... C09B 62/09; C09B 62/095; C09B 62/533; C09B 62/535
[52] U.S. Cl. .................................. 534/637; 544/187; 544/204; 544/208; 534/625
[58] Field of Search ............... 260/146 D, 146 T, 153, 260/154

[56] References Cited

U.S. PATENT DOCUMENTS

| | | | |
|---|---|---|---|
| 2,919,269 | 12/1959 | Nickel et al. ..................... | 260/146 T |
| 3,040,021 | 6/1962 | Gunst ................................ | 260/153 |
| 3,544,547 | 12/1970 | Crabtree et al. ................ | 260/146 T |
| 3,655,642 | 4/1972 | Meininger et al. ............. | 260/153 X |
| 4,069,218 | 1/1978 | Hegar ................................ | 260/153 |

FOREIGN PATENT DOCUMENTS 1454210 11/1976 United Kingdom ................ 260/153

*Primary Examiner*—Floyd D. Higel
*Attorney, Agent, or Firm*—Curtis, Morris & Safford

[57] ABSTRACT

The novel water-soluble disazo dyestuffs consist of two monoazo dyestuff moieties each containing as diazo component an amine of the benzene or naphthalene series and as coupling component an amino-naphthol-mono- or disulfonic acid. The two moieties are bonded to each other via a triazine radical which carries a halogen atom, and is bound to the amino groups of the coupling components and the diazo components contain a fiber-reactive radical of the vinyl sulfone series. To produce the dyestuffs 2 mols of the diazo compound carrying the fiber-reactive radical of the vinyl sulfone series is coupled with 1 mol of a bivalent coupling component consisting of 2 radicals of the aminonaphthol bound to the triazine ring via the amino groups, or two monoazo dyestuffs each synthesized from the aforesaid diazo component and an aminonaphthol-disulfonic acid coupling component are reacted with a 1,3,5-trihalogeno-triazine. The metal-free dyestuffs can be transformed into the corresponding heavy metal complex dyestuffs, preferably copper, cobalt and chromium complex dyestuffs, by treatment with an agent donating a heavy metal cation. The novel dyestuffs are excellently suitable for dyeing and printing fiber material of natural and regenerated cellulose and natural, regenerated and synthetic polyamides. They are distinguished by clear shades, high tinctorial strength, a very good uptake from a long liquor and a good color-build up. The dyeings obtained therewith have a high fastness to processing and in use.

13 Claims, No Drawings

WATER-SOLUBLE METAL FREE OR COPPER TRIAZINO-BIS-[HYDROXY-NAPHTHYLAMINO]-DISAZO DYESTUFFS CONTAINING FIBER REACTIVE GROUPS, AND A PROCESS FOR DYEING OR PRINTING CELLULOSE FIBERS

This is a continuation of copending application Ser. No. 076,755 filed Sept. 18, 1979, now abandoned which is a continuation of application Ser. No. 956,409, filed Oct. 31, 1978, now abandoned.

The present invention relates to novel valuable, water-soluble dyestuffs which in the form of the free acid have the general formula (I) free acid have the general formula (I)

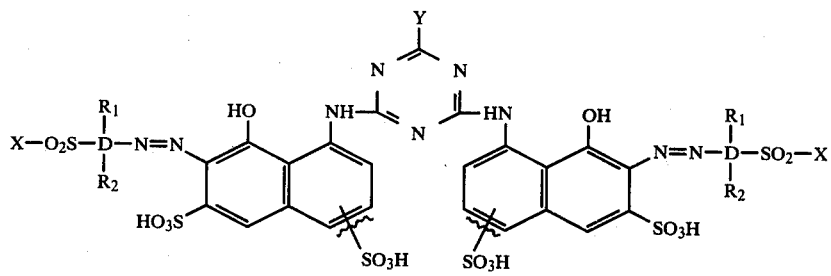

in which the individual radicals in the formula have the following meanings: D is a benzene nucleus or naphthalene nucleus; $R_1$ is in the ortho-position relative to the azo group on D and denotes a hydrogen atom, a halogen atom, preferably a chlorine or bromine atom, a lower alkyl group, preferably a methyl group, a lower alkoxy group, preferably a methoxy group, a hydroxy or carboxy group or a sulfonic acid group and $R_2$ is a hydrogen atom, a halogen atom, preferably a chlorine or bromine atom, a lower alkyl group, preferably a methyl group, a lower alkoxy group, preferably a methoxy group, a nitro group or a sulfonic acid group, it being possible for $R_1$ and $R_2$ to be identical or different from one another; X represents the β-thiosulfatoethyl group, preferably the vinyl or β-sulfatoethyl group; and Y is a chlorine, fluorine or bromine atom, preferably a chlorine atom.

One sulfo group in the aminonaphthol-disulfonic acid radicals of the abovementioned formula can, according to the curved bracket, be in the 3-position or 4-position of the 1-amino-naphthol(8)-di-sulfonic acid. The two aminonaphtholdisulfonic acid radicals which are bonded to the triazine ring can be identical or different but are preferably identical.

The two radicals

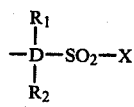

in the formula can be identical or different in the general formula (1); preferably they are identical.

Here and in the text which follows, the term "lower" used in the definitions denotes that the alkyl or alkylene radical contained in the group consists of 1–4C atoms.

The present invention also relates to heavy metal complex dyestuffs of the abovementioned formula (1), in which one or both of the $R_1$s represents a hydroxy group and bond the metal as a complex together with the hydroxy groups of the coupling component. The heavy metal complex dyestuffs are preferably those in which two heavy metal equivalents are each bonded in complex form to one molecule of the formula (1), specifically in each case to the hydroxy groups $R_1$ and those of the aminonaphthol-disulfonic acid radicals. Preferred heavy metal complex dyestuffs are the copper, cobalt and chromium complex dyestuffs of the formula (1) according to the invention, especially the copper dyestuffs.

The novel dyestuffs can be in the form of the free acid or in the form of their salts. They are preferably in the form of the salts, especially the alkali metal and alkaline earth metal salts and in particular the sodium and potassium salts and also the calcium salts. The novel dyestuffs are preferably used in the form of the alkali metal salts for dyeing and printing fiber materials.

The present invention also relates to a process for the manufacture of the novel dyestuffs of the formula (1), which comprises reacting 2 moles of the diazonium compound of one or two aromatic amines, preferably a single aromatic amine of the general formula (2)

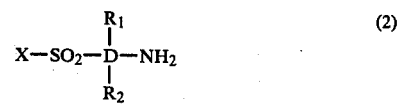

in which D, $R_1$, $R_2$ and X are as defined above and $R_1$ is in the ortho-position relative to the amino group, with 1 mole of a coupling component of the general formula (3)

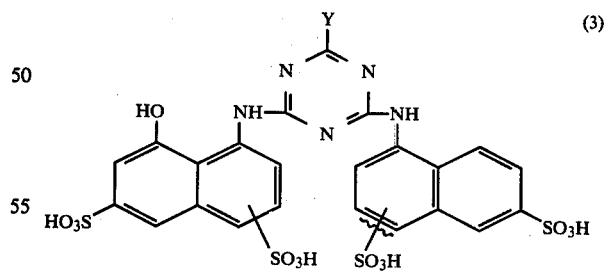

in which Y is as defined above.

The present invention also relates to a process for the manufacture of the heavy metal complex dyestuffs of the abovementioned general formula (1), which comprises reacting the metal-free dyestuffs of the formula (1) in which $R_1$ represents a hydrogen atom or a hydroxy or lower alkoxy group, if desired immediately following the abovementioned procedure, according to the invention, for the manufacture of the metal-free dyestuffs of the formula (1), in a manner which is in itself known, if appropriate in the presence of an oxidizing agent, with a metal donor.

The metal-free dyestuffs of the formula (1) or their heavy metal complexes can, however, also be manufactured in a manner according to the invention by subjecting 2 moles of a monoazo compound which in the form of the free acid corresponds to the general formula (4)

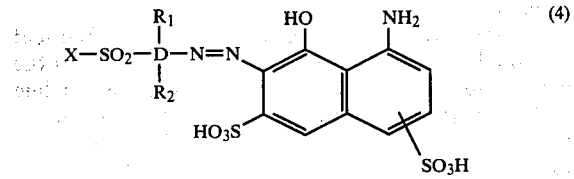

in which $R_1$, $R_2$, D and X are as defined above, or 2 moles of the heavy metal complex compounds thereof, in which $R_1$ is a hydroxy group, preferably the 1:1 copper complex compound, or 1 mole of this heavy metal compound and 1 mole of the metal-free compound of the formula (4) to a condensation reaction with a trihalogen-s-triazine compound of the formula (5)

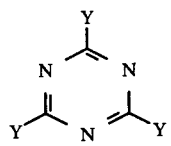

in which Y is as defined above, and, if desired, subsequently reacting the product in a manner which is in itself known, if appropriate in the presence of an oxidizing agent, with an agent which denotes a heavy metal cation. These reactions are preferably carried out in aqueous solution, optionally in the presence of organic solvents, at room temperature (15°–25° C.) or elevated temperature (up to 120° C.) in accordance with known processes in an analogous manner well-known to those skilled in the art. If the heavy metal complex dyestuffs are manufactured by subsequent metallization, as indicated here, one or both of the $R_1$s in the compounds (4) or (1) can be a hydrogen atom, a hydroxy group or a lower alkoxy group.

It is also possible, in a manner according to the invention, to convert a heavy metal complex dyestuff according to formula (1) into a heavy metal dyestuff according to the invention which contains a different heavy metal central atom, by splitting the original heavy metal atom from the complex dyestuff analogously to the known methods (see, for example, Angew. Chem. 64, 397 (1952)) and reacting the resulting o,o′-dihydroxy-azo dyestuff with an agent which supplies the other heavy metal atom. Thus, for example, copper complex dyestuffs of the formula (1) can be converted to the corresponding chromium or cobalt complex dyestuffs of the formula (1).

Preferred dyestuffs, according to the invention, of the formula (1) and their heavy metal complexes are those in which D represents a benzene nucleus and also those in which D represents a naphthalene nucleus, in which the azo group is bonded in the β-position of this naphthalene nucleus. Further preferred dyestuffs according to the invention are those in which Y denotes a chlorine atom.

Further preferred compounds of the formula (1) are those in which D is a benzene nucleus and $R_1$, $R_2$, Y and X have one of the abovementioned meanings, especially the preferred meanings, and also compounds of the formula (1) in which D denotes a naphthalene nucleus which is bonded in the 2-position to the azo group, $R_1$ represents a hydrogen atom and $R_2$ represents the sulfo group in the 6-position of the naphthalene nucleus, or in which $R_1$ denotes the sulfo group and $R_2$ represents a hydrogen atom, and Y and X have one of the abovementioned meanings, especially the preferred meanings.

Dyestuffs which are also preferred are dyestuffs of the general formula (1) in which $R_1$ and $R_2$ have the abovementioned meanings, especially the preferred meanings, and Y is chlorine and X is a β-sulfatoethyl group, the sulfo group in the aminonaphthol radical in each case preferably being in the meta-position relative to the amino group, and also dyestuffs of the general formula (1) in which $R_1$ and $R_2$ both denote hydrogen, D represents a benzene nucleus, Y represents a chlorine atom, X represents a β-sulfatoethyl group and the group —$SO_2$—X in the radical D in the formula is in the para-position relative to the amino group, the sulfo group in the aminonaphthol radical in each case preferably being in the meta-position relative to the amino group.

Further preferred compounds of the formula (1) are those in which D represents a benzene nucleus, in which the group —$SO_2$—X is in the meta-position or para-position relative to the azo group, or in which D denotes a naphthalene nucleus which is bonded in the 2-position to the azo group and which contains the group —$SO_2$—X in the 6-position or 8-position, and $R_1$, $R_2$, $K_1$, $K_2$, Y and X have one of the abovementioned meanings, especially the preferred meanings.

Aromatic amines of the formula (2) are known, for example from German Patent Specification Nos. 1,278,041, 1,276,842, 1,150,163, 1,126,542 and 1,153,029, from German Offenlegungsschriften Nos. 2,154,943, 2,100,080, 2,049,664, 2,142,728, 2,034,591 and 1,943,904 or from German Auslegeschrift No. 1,204,666.

Aromatic amines of the formula (2) which may be mentioned are, in particular, the following compounds: aniline-3-β-sulfatoethylsulfone, aniline-4-β-sulfatoethylsulfone, 2-amino-toluene-4-β-sulfatoethylsulfone, 2-aminoanisole-4-β-sulfatoethylsulfone, 2-amino-anisole-5-β-sulfatoethylsulfone, 2-amino-4-β-sulfatoethylsulfonyl-benzoic acid, 2,5-dimethoxy-aniline-4-β-sulfatoethylsulfone, 2-methoxy-5-methyl-aniline-4-β-sulfatoethylsulfone, 2,4-dimethoxyaniline-5-β-sulfatoethylsulfone, 4-aminoanisole-2-β-sulfatoethylsulfone, 4-aminotoluene-2-β-sulfatoethylsulfone, 4-β-sulfatoethylsulfonyl-aniline-2-sulfonic acid, 5-β-sulfatoethylsulfonyl-aniline-2-sulfonic acid, 2-chloroaniline-4-β-sulfatoethylsulfone, 2-chloroaniline-5-β-sulfatoethylsulfone, 2-bromoaniline-4-β-sulfatoethylsulfone, 2,6-dichloroaniline-4-β-sulfatoethylsulfone, 2,6-dimethyl-aniline-4-β-sulfatoethylsulfone, 2,6-dimethyl-aniline-3-β-sulfatoethylsulfone, 2-amino-phenol-4-β-sulfatoethylsulfone, 2-aminophenol-5-β-sulfatoethylsulfone, 6-bromo-2-aminophenol-4-β-sulfatoethylsulfone, 6-chloro-2-aminophenol-4-β-sulfatoethylsulfone, 6-nitro-2-aminophenol-4-β-sulfatoethylsulfone, 4-methyl-2-aminophenol-5-β-sulfatoethylsulfone, 2-naphthylamine-5-β-sulfatoethylsulfone, 2-naphthylamine-8-β-sulfatoethylsulfone, 8-β-sulfatoethylsulfonyl-2-amino-naphthalene-6-sulfonic acid, 6-β-sulfatoethylsulfonyl-2-amino-naphthalene-1-sulfonic acid, 2-naphthylamine-6-β-sulfatoethylsulfone and the corresponding β-thiosulfatoethylsulfones and vinylsulfones.

The coupling components of the formula (3) are likewise known and are described, for example, in German Patent Specification No. 436,179. Examples of coupling components of the formula (3) which can be used are:

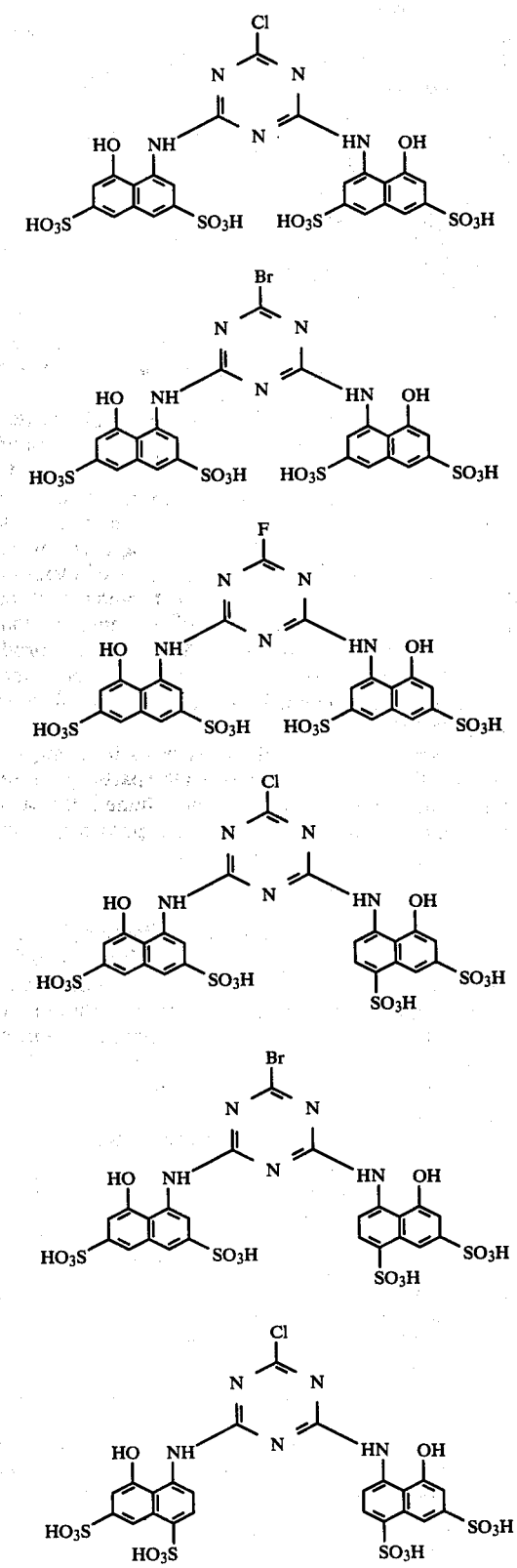

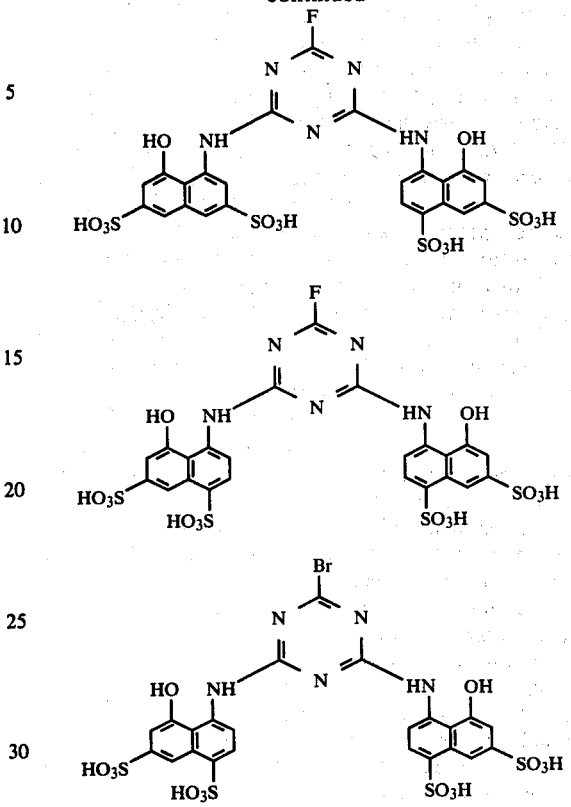

The diazotization of the aromatic amines of the formula (2) is carried out by generally known methods. However, care must be taken that these aromatic amines, and the diazonium salts obtained therefrom, are not subjected to strongly alkaline conditions during processing.

The coupling of the diazotized amines with the coupling components of the formula (3) is preferably carried out in a pH range between 3 and 7, at temperatures between −5° and +30° C.

If a hydroxy group is present in the o-position relative to the azo bridges in the radicals of the diazo components, that is to say if $R_1$=OH in the formula (1), the dyestuffs are converted to the heavy metal complex dyestuffs by adding a heavy metal donor to the dyestuff solution or the dyestuff suspension, if necessary with an acid-binding agent and if necessary with treatment at elevated temperature (in general the metallization can be carried out at 0°–120° C.) until the conversion to the desired heavy metal complex dyestuff is complete.

Examples of heavy metal donors which can be used are: copper salts, such as copper sulfate, copper chloride, copper acetate or copper carbonate, chromium salts, such as chromium formate, chromium acetate, chromium sulfate, potash/chrome alum or chromium/salicylic acid, or cobalt salts, such as cobalt sulfate, cobalt chloride or a cobalt/tartaric acid complex.

Acid-binding agents used when converting the dyestuffs to the heavy metal complex dyestuffs are preferably alkali metal salts of weak inorganic or organic acids, such as sodium carbonate, sodium bicarbonate, primary or secondary sodium phosphate or sodium acetate.

If $R_1$ in formula (1) is an alkoxy group, preferably a methoxy group, this can be converted by known methods, during the reaction to convert the dyestuff to the heavy metal complex dyestuff, preferably the copper complex dyestuff, to a hydroxy group and the latter can participate in the formation of the complex.

If $R_1$ in formula (1) is a hydrogen atom, this can be replaced by a hydroxy group under the conditions of oxidative coppering [Angew. Chem. 70, 232–238 (1958)], with simultaneous incorporation of the said hydroxy group into the complex compound. The oxidizing agents used are advantageously derivatives of hydrogen peroxide, such as sodium peroxide, salts of peroxysulfuric acid or salts of perboric acid, but preferably hydrogen peroxide itself. Advantageous reaction conditions in general lie at 20°–100° C. and pH values between 7 and 3.

The starting dyestuffs of the formula (4) can be prepared by known methods, for example by the process described in German Auslegeschrift No. 1,126,542.

The resulting dyestuffs of the formula (1) or their heavy metal complex compounds are separated off by generally known methods, either by precipitating from the reaction medium by means of electrolytes, such as, for example, sodium chloride or potassium chloride, or by evaporating the reaction solution, for example by spray-drying. If the latter method of isolating the dyestuff is chosen, it is advisable, before evaporating, to remove any amounts of sulfate which may be present in the solutions by precipitating these as gypsum and separating them off by filtration. In some cases, it can also be desirable to supply the dyestuff solution direct, if appropriate after adding buffer substances, as a liquid preparation for use in dyeing.

The present invention also relates to the dyeing and printing of cellulose and polyamide fiber materials with the dyestuffs according to the invention.

Cellulose fiber materials are understood as meaning preferably cotton and regenerated cellulose, but also other vegetable fibers, such as linen, hemp and jute. Polyamide fibers are to be understood as meaning both those of natural origin and those of synthetic origin, that is to say both wool and other animal hairs and silk and also polyamide 6,6, polyamide 6, polyamide 11 or polyamide 4.

The dyestuffs according to the invention can be applied to the said substrates by the application techniques known for reactive dyestuffs.

Thus, with these dyestuffs very good color yields are obtained on cellulose fibers by the exhaustion method from a long liquor, using very diverse alkali additives.

Excellent color yields are also obtained on cellulose fibers by the pad method, and the dyes can be fixed by a residence time at room temperature, by steaming or with dry heat.

Intense prints with outlines in a good state and a clear white ground are also obtained by the conventional printing processes for cellulose fibers—in a single phase in the presence of sodium bicarbonate or other acid-binding agents in the printing paste with subsequent steaming at 101°–103° C. or in two phases, printing with a neutral or weakly acid printing paste and then either passing through a hot electrolyte-containing alkaline bath or over-padding with an alkaline electrolyte-containing padding liquor and then developing by means of a residence time, steaming or dry heat. The appearance of the prints is only slightly dependent on changing fixing conditions. Both in dyeing and in printing, the degrees of fixation obtained with the dyestuffs according to the invention are exceptionally high.

With regard to the coloristic properties of the dyestuffs according to the invention, it must be emphasized in particular that these dyestuffs are distinguished by good stability in printing pastes and padding liquors, including in the presence of alkali, by a very good uptake from a long liquor, by good color build-up by the conventional dyeing and printing processes, by an identical depth of shade when dyeing on cotton and regenerated cellulose fibers, by levelness of the dyeings and prints produced therewith and also by a uniform appearance of the dyeings from a long liquor in the presence of different amounts of electrolytes, such as sodium sulfate or sodium chloride.

The fastness properties of the dyeings and prints obtained with the dyestuffs of the invention, especially those on cellulose fibers, are appreciable. This equally applies in the case of the most important fastness to processing and in use. The fastness to light, the fastness to wet processing, such as fastness to washing, fastness to milling, fastness to water and fastness to seawater, and the fastness to ironing and fastness to rubbing should be mentioned in particular.

The dyeings on polyamide fibers are usually carried out from an acid medium. Thus, for example, acetic acid or acetic acid and ammonium acetate can be added to the dyebath in order to obtain the desired pH value. In order to obtain a usable levelness of the dyeings, it is advisable to add conventional levelling agents, for example those based on a reaction product of cyanuric chloride with three times the molar amount of an aminobenzenesulfonic acid and/or of an aminonaphthalenesulfonic acid and/or those based on a reaction product of, for example, stearylamine with ethylene oxide. The dyeings can be carried out either at the boil or at 110° to 120° C.

The examples which follow serve to illustrate the invention. The relationship between the parts by weight quoted in the examples and parts by volume is the same as that between kilogram and liter. The percentages are by weight unless stated otherwise.

EXAMPLE 1

281 parts by weight of aniline-4-β-sulfatoethylsulfone are suspended in 1,400 parts by volume of water and 600 parts by weight of ice and dissolved by adding 62.5 parts by weight of sodium carbonate to the solution, the resulting pH value being 6.0–6.5. 205 parts by volume of aqueous 5N sodium nitrite solution are then added, 10 parts by weight of kieselguhr are stirred in and the solution is clarified. The filtrate is allowed to run at 0°–5° C. into a mixture of 1,500 parts by weight of ice and 282 parts by weight of aqueous 31% strength hydrochloric acid. The mixture is stirred for one hour at 0°–5° C., the excess nitrous acid is then destroyed with amidosulfonic acid and the pH of the resulting diazonium salt solution is then adjusted to 6.0 by introducing 45 parts by weight of sodium bicarbonate. This solution is allowed to run in the course of 15 minutes into a solution of the secondary condensation product of ½ mole of cyanuric chloride and 1 mole of 1-amino-8-naphthol-3,6-disulfonic acid, which is prepared as follows:

92.5 parts by weight of cyanuric chloride are dissolved in 250 parts by volume of acetone with slight warming and the solution is then poured into 2,500 parts by volume of water, with good stirring. A solution of 159.5 parts by weight of 1-amino-8-naphthol-3,6-disulfonic acid and 60.5 parts by weight of aqueous 33% strength sodium hydroxide solution in 750 parts by volume of water is then added at about 20° C. and the mixture is stirred for 10 minutes. A further solution of 154 parts by weight of 1-amino-8-naphthol-3,6-disulfonic acid, 60.5 parts by weight of aqueous 33% strength sodium hydroxide solution and 150 parts by weight of sodium acetate in 750 parts by volume of water is then added and the resulting mixture is stirred for a further 1 hour.

After the diazonium salt solution and the solution of the coupling component have been combined, the mixture is stirred for several hours at about 20° C., the pH value being kept at 5.3-6.1 by adding a total of about 142 parts by weight of sodium bicarbonate in portions. After coupling in the batch is complete, the solution is clarified and the dyestuff is isolated by spray-drying. This gives 1,095 parts by weight of a red dyestuff powder which contains 55.8% of pure dyestuff with a molecular weight of 1,333.5 and which, in the presence of alkaline agents, gives very deep and fast red dyeings and prints on cellulose fibers.

In the form of the free acid, the dyestuff has the following formula:

temperature rising to 60° C. The mixture is kept at 65°-70° C. for 4 hours, then allowed to cool to 30° C. and added to a mixture of 2,500 parts by weight of ice and 1,000 parts by volume of water. The diazotization reaction is then carried out at 0°-5° C. by adding 200 parts by volume of aqueous 5N sodium nitrite solution, the reaction mixture is stirred for a further one hour at 0°-5° C. and the pH is then adjusted to 5.0 by adding 1,186 parts by weight of calcium carbonate. The diazonium salt solution is coupled with the coupling solution described in Example 1, 58 parts by weight of sodium bicarbonate being added in portions in order to keep the pH value at 5.5-6.5. After 15 hours, the reaction mixture is warmed to 60°-65° C. and the gypsum which has precipitated is filtered off and washed with hot water in several portions. 390 parts by weight of potassium chloride are added to the filtrate, whereupon the dyestuff precipitates. The latter is filtered off and dried in vacuo at 60° C. In the form of the free acid, the dyestuff has the following constitution

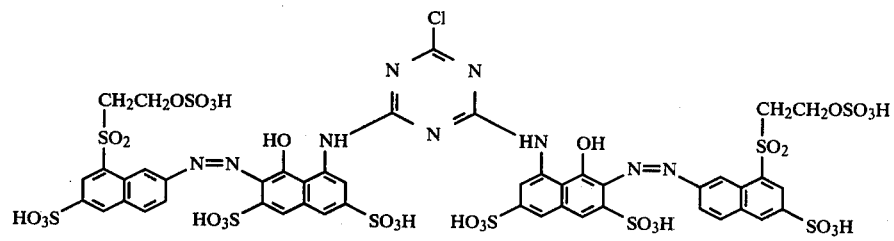

and dyes cotton in claret-colored shades by the dyeing methods customary for reactive dyestuffs.

In a manner analogous to that described in Examples

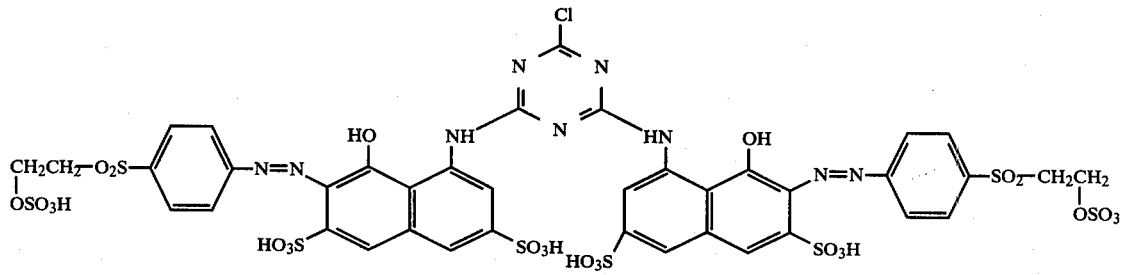

EXAMPLE 2

251 parts by weight of 2-naphthylamine-8-β-hydroxyethylsulfone are introduced in the course of 20 minutes into 660 parts by volume of 20% strength oleum, the 1 and 2, dyestuffs can be obtained from the diazo components and coupling components listed in the table which follows; these dyestuffs dye and print cotton in the indicated color shades.

TABLE 1

| Example No. | Diazo component | Coupling component | Color shade on cotton |
|---|---|---|---|
| 3 | 2 moles of aniline-3-β-sulfatoethylsulfone | condensation product of 1 mole of cyanuric chloride with 2 moles of 1-amino-8-naphthol-3,6-disulfonic acid | red |
| 4 | 2 moles of 2-aminoanisole-5-β-sulfatoethylsulfone | condensation product of 1 mole of cyanuric chloride with 2 moles of 1-amino-8-naphthol-36,disulfonic acid | claret |
| 5 | 2 moles of 2-aminoanisole-4-β-sulfatoethylsulfone | condensation product of 1 mole of cyanuric chloride with 2 moles of 1-amino-8-naphthol-3,6-disulfonic acid | claret |
| 6 | 2 moles of 2-aminotoluene-4- | condensation product of | red |

TABLE 1-continued

| Example No. | Diazo component | Coupling component | Color shade on cotton |
|---|---|---|---|
| | β-sulfatoethylsulfone | 1 mole of cyanuric chloride with 2 moles of 1-amino-8-naphthol-3,6-disulfonic acid | |
| 7 | 2 moles of 2-methoxy-5-methyl-aniline-4-β-sulfatoethyl-sulfone | condensation product of 1 mole of cyanuric chloride with 2 moles of 1-amino-8-naphthol-3,6-disulfonic acid | claret |
| 8 | 2 moles of 2,5-dimethoxy-aniline-4-β-sulfatoethylsulfone | condensation product of 1 mole of cyranuric chloride with 2 moles of 1-amino-8-naphthol-3,6-disulfonic acid | claret |
| 9 | 2 moles of 2-chloroaniline-5-β-sulfatoethylsulfone | condensation product of 1 mole of cyanuric chloride with 2 moles of 1-amino-8-naphthol-3,6-disulfonic acid | red |
| 10 | 2 moles of 2,6-dimethylaniline-4-β-sulfatoethylsulfone | condensation product of 1 mole of cyanuric chloride with 2 moles of 1-amino-8-naphthol-3,6-disulfonic acid | red |
| 11 | 2 moles of 2,6-dimethylaniline-3-β-sulfatoethylsulfone | condensation product of 1 mole of cyanuric chloride with 2 moles of 1-amino-8-naphthol-3,6-disulfonic acid | red |
| 12 | 2 moles of 2,4-dimethoxyaniline-5-β-sulfatoethylsulfone | condensation product of 1 mole of cyanuric chloride with 2 moles of 1-amino-8-naphthol-3,6-disulfonic acid | bluish-tinged red |
| 13 | 2 moles of 2-aminoanisole-4-β-thiosulfatoethylsulfone | | claret |
| 14 | 2 moles of aniline-4-β-thiosulfatoethylsulfone | condensation product of 1 mole of cyanuric chloride with 2 moles of 1-amino-8-naphthol-3,6-disulfonic acid | red |
| 15 | 2 moles of 4-aminoanisole-2-β-sulfatoethylsulfone | condensation product of 1 mole of cyanuric chloride with 2 moles of 1-amino-8-naphthol-3,6-disulfonic acid | claret |
| 16 | 2 moles of 4-β-sulfatoethyl-sulfonyl-aniline-2-sulfonic acid | condensation product of 1 mole of cyanuric chloride with 2 moles of 1-amino-8-naphthol-3,6-disulfonic acid | red |
| 17 | 2 moles of 4-aminotoluene-2-β-sulfatoethylsulfone | condensation product of 1 mole of cyanuric chloride with 2 moles of 1-amino-8-naphthol-3,6-disulfonic acid | red |
| 18 | 2 moles of 2-aminoanisole-4-vinylsulfone | condensation product of 1 mole of cyanuric chloride with 2 moles of 1-amino-8-naphthol-3,6-disulfonic acid | claret |
| 19 | 2 moles of aniline-4-vinyl-sulfone | condensation product of 1 mole of cyanuric chloride with 2 moles of 1-amino-8-naphthol-3,6-disulfonic acid | red |
| 20 | 2 moles of aniline-3-vinyl-sulfone | condensation product of 1 mole of cyanuric chloride with 2 moles of 1-amino-8-naphthol-3,6-disulfonic acid | red |
| 21 | 2 moles of 2-bromoaniline-4-β-sulfatoethylsulfone | condensation product of 1 mole of cyanuric chloride with 2 moles of 1-amino-8-naphthol-3,6-disulfonic acid | red |
| 22 | 2 moles of 2,6-dichloroaniline-4-β-sulfatoethylsulfone | condensation product of 1 mole of cyanuric chloride with 2 moles of 1-amino-8-naphthol-3,6-disulfonic | red |

TABLE 1-continued

| Example No. | Diazo component | Coupling component | Color shade on cotton |
|---|---|---|---|
| 23 | 2 moles of 6-β-sulfatoethylsulfonyl-2-amino-naphthalene-1-sulfonic acid | condensation product of 1 mole of cyanuric chloride with 2 moles of 1-amino-8-naphthol-3,6-disulfonic acid | bluish-tinged red |
| 24 | 2 moles of 2-naphthylamine-5-β-sulfatoethylsulfone | condensation product of 1 mole of cyanuric chloride with 2 moles of 1-amino-8-naphthol-3,6-disulfonic acid | red |
| 25 | 2 moles of 2-naphthylamine-8-β-sulfatoethylsulfone | condensation product of 1 mole of cyanuric chloride with 2 moles of 1-amino-8-naphthol-3,6-disulfonic acid | bluish-tinged red |
| 26 | 2 moles of 2-naphthylamine-6-β-sulfatoethylsulfone | condensation product of 1 mole of cyanuric chloride with 2 moles of 1-amino-8-naphthol-3,6-disulfonic acid | bluish-tinged red |
| 27 | 2 moles of 2-chloroaniline-4-β-sulfatoethylsulfone | condensation product of 1 mole of cyanuric chloride with 2 moles of 1-amino-8-naphthol-3,6-disulfonic acid | red |
| 28 | 2 moles of 2-amino-4-β-sulfatoethyl-sulfonyl-benzoic acid | condensation product of 1 mole of cyanuric chloride with 2 moles of 1-amino-8-naphthol-3,6-disulfonic acid | red |
| 29 | 2 moles of 5-β-sulfatoethylsulfonyl-aniline-2-sulfonic acid | condensation product of 1 mole of cyanuric chloride with 2 moles of 1-amino-8-naphthol-3,6-disulfonic acid | red |
| 30 | 2 moles of aniline-4-β-sulfatoethylsulfone | condensation product of 1 mole of cyanuric chloride with 2 moles of 1-amino-8-naphthol-4,6-disulfonic acid | red |
| 31 | 2 moles of aniline-3-β-sulfatoethylsulfone | condensation product of 1 mole of cyanuric chloride with 2 moles of 1-amino-8-naphthol-4,6-disulfonic acid | red |
| 32 | 2 moles of aniline-4-β-thiosulfato-ethylsulfone | condensation product of 1 mole of cyanuric chloride with 2 moles of 1-amino-8-naphthol-4,6-disulfonic acid | red |
| 33 | 2 moles of aniline-4-vinylsulfone | condensation product of 1 mole of cyanuric chloride with 2 moles of 1-amino-8-naphthol-4,6-disulfonic acid | red |
| 34 | 2 moles of 2-aminoansisole-4-β-sulfato-ethylsulfone | condensation product of 1 mole of cyanuric chloride with 2 moles of 1-amino-8-napthol-4,6-disulfonic acid | claret |
| 35 | 2 moles of 2-methoxy-5-methylaniline-4-β-sulfatoethylsulfone | condensation product of 1 mole of cyanuric chloride with 2 moles of 1-amino-8-naphthol-4,6-disulfonic acid | claret |
| 36 | 2 moles of 2,5-dimethoxyaniline-4-β-sulfatoethylsulfone | condensation product of 1 mole of cyanuric chloride with 2 moles of 1-amino-8-naphthol-4,6-disulfonic acid | claret |
| 37 | 2 moles of 8-β-sulfatoethylsulfonyl-2-amino-naphthalene-6-sulfonic acid | condensation product of 1 mole of cyanuric chloride with 2 moles of 1-amino-8-naphtol-4,6-disulfonic acid | claret |
| 38 | 2 moles of 6-β-sulfatoethylfonyl-2-amino-naphthalene-1-sulfonic acid | condensation product of 1 mole of cyanuric chloride with 2 moles of 1-amino-8-naphthol-4,6-disulfonic | bluish-tinged red |

TABLE 1-continued

| Example No. | Diazo component | Coupling component | Color shade on cotton |
|---|---|---|---|
| 39 | 2 moles of 2-naphthylamino-6-β-sulfato-ethylsulfone | condensation product of 1 mole of cyanuric chloride with 2 moles of 1-amino-8-naphthol-4,6-disulfonic acid | bluish-tinged red |
| 40 | 2 moles of 2-naphthylamine-8-β-sulfatoethylsulfone | condensation product of 1 mole of cyanuric chloride with 2 moles of 1-amino-8-naphthol-4,6-disulfonic acid | bluish-tinged red |
| 41 | 2 moles of 2-naphthylamine-5-β-sulfatoethylsulfone | condensation product of 1 mole of cyanuric chloride with 2 moles of 1-amino-8-naphthol-4,6-disulfonic acid | red |
| 42 | 2 moles of aniline-4-β-sulfato-ethylsulfone | condensation product of 1 mole of cyanuric chloride with 1 mole of 1-amino-8-naphthol-3,6-disulfonic acid and 1 mole of 1-amino-8-naphthol-4,6-disulfonic acid | red |
| 43 | 2 moles of aniline-3-β-sulfato-ethylsulfone | condensation product of 1 mole of cyanuric chloride with 1 mole of 1-amino-8-naphthol-3,6-disulfonic acid and 1 mole of 1-amino-8-naphthol-4,6-disulfonic acid | red |
| 44 | 2 moles of aniline-4-vinylsulfone | condensation product of 1 mole of cyanuric chloride with 1 mole of 1-amino-8-naphthol-3,6-disulfonic acid and 1 mole of 1-amino-8-naphthol-4,6-disulfonic acid | red |
| 45 | 2 moles of aniline-4-β-thiosulfato-ethylsulfone | condensation product of 1 mole of cyanuric chloride with 1 mole of 1-amino-8-naphthol-3,6-disulfonic acid and 1 mole of 1-amino-8-naphthol-4,6-disulfonic acid | red |
| 46 | 2 moles of 2-aminoanisole-4-β-sulfatoethylsulfone | condensation product of 1 mole of cyanuric chloride with 1 mole of 1-amino-8-naphthol-3,6-disulfonic acid and 1 mole of 1-amino-8-naphthol-4,6-disulfonic acid | claret |
| 47 | 2 moles of aniline-3-vinylsulfone | condensation product of 1 mole of cyanuric chloride with 1 mole of 1-amino-8-naphthol-3,6-disulfonic acid and 1 mole of 1-amino-8-naphthol-4,6-disulfonic acid | red |
| 48 | 2 moles of 2-aminoanisole-4-β thiosulfatoethylsulfone | condensation product of 1 mole of cyanuric chloride with 1 mole of 1-amino-8-naphthol-3,6-disulfonic acid and 1 mole of 1-amino-8-naphthol-4,6-disulfonic acid | claret |
| 49 | 2 moles of 2,5-dimethoxyaniline-4-β-sulfatoethylsulfone | condensation product of 1 mole of cyanuric chloride with 1 mole of 1-amino-8-naphthol-3,6-disulfonic acid and 1 mole of 1-amino-8-naphthol-4,6-disulfonic acid | claret |
| 50 | 2 moles of 2-methoxy-5-methylaniline-4-β-sulfatoethylsulfone | condensation product of 1 mole of cyanuric chloride with 1 mole of 1-amino-8-naphthol-3,6-disulfonic acid and 1 mole of 1-amino-8-naphthol-4,6-disulfonic acid | bluish-tinged red |
| 51 | 2 moles of 2-aminonaphthalene- | condensation product of | blusih-tinged red |

TABLE 1-continued

| Example No. | Diazo component | Coupling component | Color shade on cotton |
|---|---|---|---|
| | 8-β-sulfatoethylsulfone | 1 mole of cyanuric chloride with 1 mole of 1-amino-8-naphthol-3,6-disulfonic acid and 1 mole of 1-amino-8-naphthol-4,6-disulfonic acid | |
| 52 | 2 moles of 2-aminonaphthalene-6-β-sulfatoethylsulfone | condensation product of 1 mole of cyanuric chloride with 1 mole of 1-amino-8-naphthol-3,6-disulfonic acid and 1 mole of 1-amino-8-naphthol-4,6-disulfonic acid | bluish-tinged red |
| 53 | 2 moles of 2-aminonaphthalene-5-β-sulfatoethylsulfone | condensation product of 1 mole of cyanuric chloride with 1 mole of 1-amino-8-naphthol-3,6-disulfonic acid and 1 mole of 1-amino-8-naphthol-4,6-disulfonic acid | red |
| 54 | 2 moles of aniline-4-β-sulfatoethylsulfone | condensation product of 1 mole of cyanuric bromide and 2 moles of 1-amino-8-naphthol-3,6-disulfonic acid | red |
| 55 | 2 moles of aniline-4-β-thiosulfatoethylsulfone | condensation product of 1 mole of cyanuric bromide and 2 moles of 1-amino-8-naphthol-3,6-disulfonic acid | red |
| 56 | 2 moles of aniline-3-vinylsulfone | condensation product of 1 mole of cyanuric bromide and 2 moles of 1-amino-8-naphthol-3,6-disulfonic acid | red |
| 57 | 2 moles of aniline-3-β-sulfatoethylsulfone | condensation product of 1 mole of cyanuric bromide and 2 moles of 1-amino-8-naphthol-3,6-disulfonic acid | red |
| 58 | 2 moles of 2-aminoanisole-4-β-sulfatoethylsulfone | condensation product of 1 mole of cyanuric bromide and 2 moles of 1-amino-8-naphthol-3,6-disulfonic acid | claret |
| 59 | 2 moles of 2-aminoanisole-4-β-thiosulfatoethylsulfone | condensation product of 1 mole of cyanuric bromide and 2 moles of 1-amino-8-naphthol-3,6-disulfonic acid | claret |
| 60 | 2 moles of 2-aminoanisole-5-β-sulfatoethylsulfone | condensation product of 1 mole of cyanuric bromide and 2 moles of 1-amino-8-naphthol-3,6-disulfonic acid | bluish-tinged red |
| 61 | 2 moles of 2-methoxy-5-methylaniline-4-β-sulfatoethylsulfone | condensation product of 1 mole of cyanuric bromide and 2 moles of 1-amino-8-naphthol-3,6-disulfonic acid | claret |
| 62 | 2 moles of 2,5-dimethoxyaniline-4-βsulfatoethylsulfone | condensation product of 1 mole of cyanuric bromide and 2 moles of 1-amino-8-naphthol-3,6-disulfonic acid | claret |
| 63 | 2 moles of 2-aminonaphthalene-8-β-sulfatoethylsulfone | condensation product of 1 mole of cyanuric bromide and 2 moles of 1-amino-8-naphthol-3,6-disulfonic acid | bluish-tinged red |
| 64 | 2 moles of 8-β-sulfatoethylsulfonyl-2-amino-naphthalene-6-sulfonic acid | condensation product of 1 mole of cyanuric bromide and 2 moles of 1-amino-8-naphthol-3,6-disulfonic acid | claret |
| 65 | 2 moles of 6-β-sulfatoethylsulfonyl-2-amino-naphthalene-1-sulfonic acid | condensation product of 1 mole of cyanuric bromide and 2 moles of 1-amino-8-naphthol-3,6-disulfonic acid | bluish-tinged red |

TABLE 1-continued

| Example No. | Diazo component | Coupling component | Color shade on cotton |
|---|---|---|---|
| 66 | 2 moles of aniline-4-β-sulfato-ethylsulfone | condensation product of 1 moles of cyanuric bromide and 2 mole of 1-amino-8-naphthol-4,6-disulfonic acid | red |
| 67 | 2 moles of aniline-3-β-sulfato-ethylsulfone | condensation product of 1 mole of cyanuric bromide and 2 moles of 1-amino-8-naphthol-4,6-disulfonic acid | red |
| 68 | 2 moles of aniline-4-β-thiosulfato-ethylsulfone | condensation product of 1 mole of cyanuric bromide and 2 moles of 1-amino-8-naphthol-4,6-disulfonic acid | red |
| 69 | 2 moles of aniline-3-vinylsulfone | condensation product of 1 mole of cyanuric bromide and 2 moles of 1-amino-8-naphthol-4,6-disulfonic acid | red |
| 70 | 2 moles of 2-aminoanisole-4-β-sulfatoehtylsulfone | condensation product of 1 mole of cyanuric bromide and 2 moles of 1-amino-8-naphthol-4,6-disulfonic acid | claret |
| 71 | 2 moles of 2-aminoanisole-4-β-thiosulfatoethylsulfone | condensation product of 1 mole of cyanuric bromide and 2 moles of cyauric bromide 8-naphthol-4,6-disulfonic acid | claret |
| 72 | 2 moles of 2-aminoanisol-5-β-sulfatoethylsulfone | condensation product of 1 mole of cyanuric bromide and 2 moles of 1-amino-8-naphthol-4,6-disulfonic acid | bluish-tinged red |
| 73 | 2 moles of 2,5-dimethoxyaniline-4-β-sulfatoethylsulfone | condensation product of 1 mole of cyanuric bromide and 2 moles of 1-amino-8-naphthol-4,6-disulfonic acid | claret |
| 74 | 2 moles of 2-methoxy-5-methylanilie-4-β-sulfatoethylsulfone | condensation product of 1 mole of cyanuric bromide and 2 moles of 1-amino-8-naphthol-4,6-disulfonic acid | claret |
| 75 | 2 moles of 8-β-sulfatoethylsulfonyl-2-aminonaphthalene-6-sulfonic acid | condensation product of 1 mole of cyanuric bromide and 2 moles of 1-amino-8-naphthol-4,6-disulfonic acid | claret |
| 76 | 2 moles of 6-β-sulfatoethylsulfonyl-2-aminonaphthalene-1-sulfonic acid | condensation product of 1 mole of cyanuric bromide and 2 moles of 1-amino-8-naphthol-4,6-disulfonic acid | bluish-tinged red |
| 77 | 2 moles of aniline-4-β-sulfato-ethylsulfone | condensation product of 1 mole of cyanuric bromide and 1 mole of 1-amino-8-naphthol-3,6-disulfonic acid and 1 mole of 1-amino-8-naphthol-4,6-disulfonic acid | red |
| 78 | 2 moles of aniline-3-β-sulfato-ethylsulfone | condensation product of 1 mole of cyanuric bromide and 1 mole of 1-amino-8-naphthol-3,6-disulfonic acid and 1 mole of 1-amino-8-naphthol-4,6-disulfonic acid | red |
| 79 | 2 moles of 2-aminoanisole-4-β-sulfatoethylsulfone | condensation product of 1 mole of cyanuric bromide and 1 mole of 1-amino-8-naphthol-3,6-disulfonic acid and 1 mole of 1-amino-8-naphthol-4,6-disulfonic acid | claret |
| 80 | 2 moles of aniline-4-β-thiosulfato-ethylsulfone | condensation product of 1 mole of cyanuric bromide and 1 mole of 1-amino-8-naphthol-3,6-disulfonic | red |

TABLE 1-continued

| Example No. | Diazo component | Coupling component | Color shade on cotton |
|---|---|---|---|
| | | acid and 1 mole of 1-amino-8-naphthol-4,6-disolfonic acid | |
| 81 | 2 moles of aniline-4-vinylsulfone | condensation product of 1 mole of cyanuric bromide and 1 mole of 1-amino-8-naphthol-3,6-disulfonic acid and 1 mole of 1-amino-8-naphthol-4,6-disulfonic acid | red |
| 82 | 2 moles of aniline-3-vinylsulfone | condensation product of 1 mole of cyanuric bromide and 1 mole of 1-amino-8-napthol-3,6-disulfonic acid and 1 mole of 1-amino-8-naphthol-4,6-disulfonic acid | red |
| 83 | 2 moles of 2-aminoanisole-4-β-thiosulfatoethylsulfone- | condensation product of 1 mole of cyanuric bromide and 1 mole of 1-amino-8-naphthol-3,6-disulfonic acid and 1 mole of 1-amino-8-naphthol-4,6-disulfonic acid | claret |
| 84 | 2 moles of 2,5-dimethoxyaniline-4-β-sulfatoethylsulfone | condensation product of 1 mole of cyanuric bromide and 1 mole of 1-amino-8-naphthol-3,6-disulfonic acid and 1 mole of 1-amino-8-naphthol-4,6-disulfonic acid | claret |
| 85 | 2 moles of 2-methoxy-5-methylaniline 4-β-sulfatoethylsulfone | condensation product of 1 mole of cyanuric bromide and 1 mole of 1-amino-8-naphthol-3,6-disulfonic acid and 1 mole of 1-amino-8-naphthol-4,6-disulfonic acid | claret |
| 86 | 2 moles of 8-β-sulfatoethylsulfonyl-2-amino-naphthalene-6-sulfonic acid | condensation product of 1 mole of cyanuric bromide and 1 mole of 1-amino-8-naphthol-3,6-disulfonic acid and 1 mole of 1-amino-8-naphthol-4,6-disulfonic acid | claret |
| 87 | 2 moles of 6-β-sulfatoethylsulfonyl-2-amino-naphthalene-1-sulfonic acid | condensation product of 1 mole of cyanuric bromide and 1 mole of 1-amino-8-naphthol-3,6-disulfonic acid and 1 mole of 1-amino-8-naphthol-4,6-disulfonic acid | bluish-tinged red |
| 88 | 2 moles of aniline-4-β-sulfato-ethylsulfone | condensation product of 1 mole of 2,4,6-trifluoro-1,3,5-triazine and 2 moles of 1-amino-8-naphthol-3,6-disulfonic acid | red |
| 89 | 2 moles of aniline-4-β-thiosulfato-ethylsulfone | condensation product of 1 mole of 2,4,6-trifluoro-1,3,5-triazine and 2 moles of 1-amino-8-naphthol-3,6-disulfonic acid acid | red |
| 90 | 2 moles of aniline-3-β-sulfato-ethylsulfone | condensation product of 1 mole of 2,4,6-trifluoro-1,3,5-triazine and 2 moles of 1-amino-8-naphthol-3,6-disulfonic acid | red |
| 91 | 2 moles of 2-aminoanisol-4-β-sulfatoethylsulfone | condensation product of 1 mole of 2,4,6-trifluoro-1,3,5-triazine and 2 moles of 1-amino-8-naphthol-3,6-disulfonic acid | claret |
| 92 | 2 moles of 2-methoxy-5-methylaniline-4-β-sulfatoethylsulfone | condensation product of 1 mole of 2,4,6-trifluoro-1,3,5-triazine and 2 moles of 1-amino-8-naphthol-3,6-disulfonic acid | claret |
| 93 | 2 moles of aniline-4-β-sulfato-ethylsulfone | condensation product of 1 mole of 2,4,6-trifluoro- | red |

TABLE 1-continued

| Example No. | Diazo component | Coupling component | Color shade on cotton |
|---|---|---|---|
| 94 | 2 moles of 8-β-sulfatoethylsulfonyl-2-amino-naphthalene-6-sulfonic acid | condensation product of 1 mole of 2,4,6-trifluoro-1,3,5-triazine and 2 moles of 1-amino-8-naphthol-4,6-disulfonic acid | claret |
| 95 | 2 moles of 6-β-sulfatoethylsulfonyl-2-amino-naphthalene-1-sulfonic acid | condensation product of 1 mole of 2,4,6-trifluoro-1,3,5-triazine and 2 moles of 1-amino-8-naphthol-4,6-disulfonic acid | bluish-tinged red |
| 96 | 2 moles of 2,5-dimethoxyaniline 4-β-sulfatoethylsulfone | condensation product of 1 mole of 2,4,6-trifluoro-1,3,5-triazine and 2 moles of 1-amino-8-naphthol-4,6-disulfonic acid | claret |
| 97 | 2 moles of aniline-4-β-sulfato-ethylsulfone | condensation product of 1 mole of 2,4,6-trifluoro-1,3,5-triazene and 1 mole of 1-amino-8-naphthol-3,6-disulfonic acid and 1 mole of 1-amino-8-naphthol-4,6-disulfonic acid | red |
| 98 | 2 moles of 2-aminoanisole-4-β-thiosulfatoethylsulfone | condensation product of 1 mole of 2,4,6-trifluoro-1,3,5-triazine and 1 mole of 1-amino-8-naphthol-3,6-disulfonic acid and 1 mole of 1-amino-8-naphthol-4,6-disulfonic acid | claret |
| 99 | 2 moles of aniline 3-vinylsulfone | condensation product of 1 mole of 2,4,6-trifluoro-1,3,5-triazine and 1 mole of 1-amino-8-naphthol-4,6-disulfonic acid and 1 mole of 1-amino-8-naphthol-4,6-disulfonic acid | red |
| 100 | 2 moles of 2,6-dimethylaniline-4-β-sulfatoethylsulfone | condensation product of 1 mole of 2,4,6-trifluoro-1,3,5-triazine and 1 mole of 1-amino-8-naphthol-3,6-disulfonic acid and 1 mole of 1-amino-8-naphthol-4,6-disulfonic acid | claret |

EXAMPLE 101

217 parts by weight of 2-aminophenol-4-β-hydroxyethylsulfone are introduced at 20°–30° C. into 500 parts by weight of 100% strength sulfuric acid and the mixture is stirred for 14 hours at room temperature. The mixture is then added to a mixture of 1,500 parts by weight of ice and 500 parts by volume of water and is then diazotized at 0°–5° C. by slowly adding 200 parts by volume of aqueous 5N sodium nitrite solution. The reaction mixture is stirred for one hour at 0°–5° C., a small amount of excess nitrous acid is then destroyed with a little amidosulfonic acid and the pH value is then adjusted to 5.5–6.0 by adding about 442 parts by weight of calcium carbonate. The diazonium salt solution is coupled with the coupling solution described in Example 1, the pH value being kept between 5.5 and 6.5 by adding about 113 parts by weight of sodium bicarbonate. After stirring for several hours at room temperature, the gypsum which has precipitated is filtered off at 60° C. and washed several times with hot water. 300 parts by weight of crystalline sodium acetate are added to the filtrate, 247 parts by weight of crystalline copper sulfate are then added and coppering is carried out for 2 hours at 50°–55° and pH 5.0–5.5. After clarifying, the dyestuff is precipitated by adding 380 parts by weight of potassium chloride and is filtered off and dried in vacuo at 60° C. This gives a dyestuff powder with which cotton can be dyed and printed in reddish-tinged violet color shades in the presence of alkalis. In the form of the free acid, the dyestuff has the following constitution

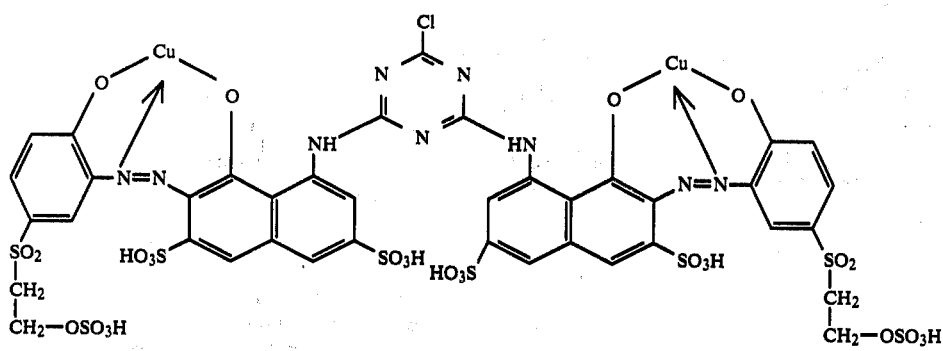

EXAMPLE 102

243 parts by weight of 6-β-hydroxyethylsulfonylbenzoxazolone are introduced at 80°–100° C. into a mixture of 225 parts by weight of 100% strength sulfuric acid and 255 parts by weight of 95.5% strength sulfuric acid and the mixture is then stirred for 5 hours at 140°–145° C. After cooling to 80° C., the mixture is added to a mixture of 1,500 parts by weight of ice and 500 parts by volume of water and diazotized and further processed as in Example 101. This gives a dyestuff powder with which violet dyeings and prints with very good fastness properties can be obtained on cellulose fibers by the dyeing and printing methods customary for reactive dyestuffs.

In the form of the free acid, the dyestuff has the following constitution:

9.25 parts by weight of cyanuric chloride are dissolved in 30 parts by volume of acetone and this solution is allowed to run into 250 parts by volume of water. A solution of 15.95 parts by weight of 1-amino-8-naphthol-4,6-disulfonic acid and 6.05 parts by weight of aqueous 33% strength sodium hydroxide solution in 75 parts by volume of water is added at 20° C. and the resulting mixture is stirred for 20 minutes at room temperature. A further solution of 15.47 parts by weight of 1-amino-8-naphthol-4,6-disulfonic acid and 6.05 parts by weight of aqueous 33% strength sodium hydroxide solution in 75 parts by volume of water is then added, 15 parts by weight of sodium acetate (crystalline) are added and the mixture is stirred for one hour at 20° C. After the diazonium salt solution has been added, the reaction mixture is stirred for 16 hours at room temperature, the pH value being kept at 5.5–6.0 by adding about

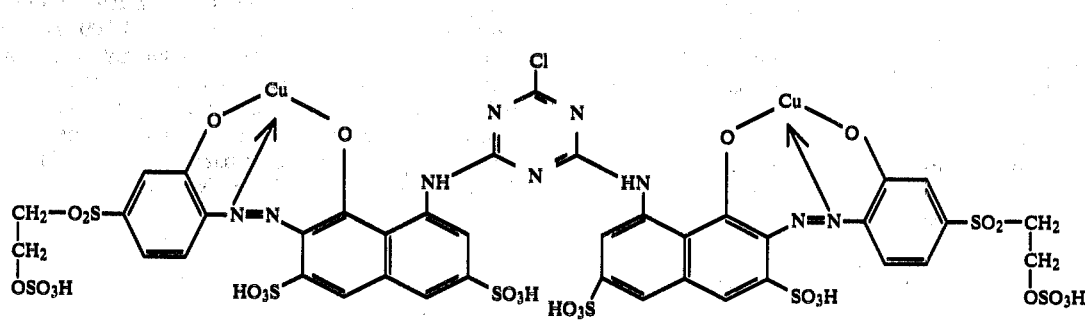

EXAMPLE 103

25.1 parts by weight of 2-aminonaphthalene-8-β-hydroxyethylsulfone are introduced into 66 parts by volume of 20% strength oleum in the course of about 20 minutes and the mixture is then warmed at 65°–70° C. for 4 hours. The reaction mixture is then cooled to 25°–30° C. and allowed to run into a mixture of 250 parts by weight of ice and 100 parts by volume of water. It is then diazotized at 0°–5° C. with 20 parts by volume of aqueous 5N sodium nitrite solution, the reaction mixture is stirred for a further one hour at this temperature and a little excess nitrous acid is then destroyed by means of amidosulfonic acid. The pH of the diazonium salt solution is adjusted to 5.0–5.5 by adding 120 parts by weight of calcium carbonate and the solution is combined with the following solution:

10.8 parts by weight of calcium carbonate in portions. The reaction mixture is then warmed to 60°–70° C. and the gypsum is filtered off. The latter is washed with hot water and 30 parts by weight of crystalline sodium acetate and 24.7 parts by weight of crystalline copper sulfate are then added to the filtrate and a mixture of 22.7 parts by weight of 30% strength hydrogen peroxide and 100 parts by volume of water is added dropwise in the course of 30 minutes at 32°–38° C. After 3 hours, the dyestuff solution is clarified and the dyestuff is precipitated by adding 460 parts by weight of potassium chloride, filtered off and dried in vacuo at 60° C. This gives a dark blue powder which gives reddish-tinged blue prints and dyeings on cotton fabric. In the form of the free acid, the dyestuff has the following constitution:

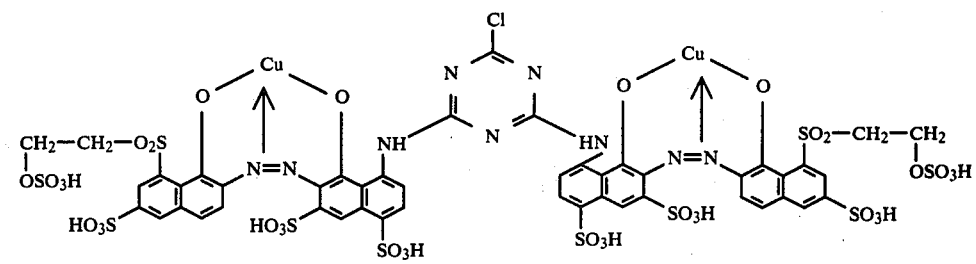

EXAMPLE 104

The non-metallized dyestuff is prepared as described in Example 101. After filtering off and washing the gypsum, the filtrate is warmed to 50°–55° C. and, at this temperature, 320 parts by weight of crystalline sodium acetate and 250 parts by weight of chromium potassium sulfate are added. The temperature is then raised to the boiling point and the mixture is boiled under reflux for 5 hours. The dyestuff solution is then clarified and then evaporated to dryness in vacuo at 60° C. This gives a grey-black dyestuff powder, with which reddish-tinged grey prints are obtained on cotton fabric in the presence of acid-binding agents. In the form of the free acid, the dyestuff has the following constitution:

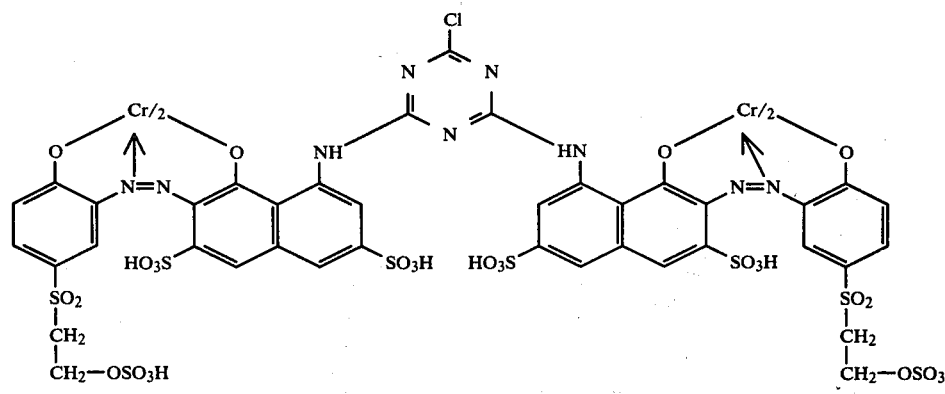

EXAMPLE 105

The non-metallized dyestuff is prepared as described in Example 101. After filtering off and washing the gypsum, 300 parts by weight of crystalline sodium acetate and 295 parts by weight of crystalline cobalt sulfate are added to the filtrate and the mixture is then warmed at 60°–65° C. for 2 hours. The dyestuff solution is clarified and then evaporated to dryness in vacuo. This gives a dark dyestuff powder with which opaque violet prints can be produced on cotton in the presence of acid-binding agents. In the form of the free acid, the dyestuff has the following constitution:

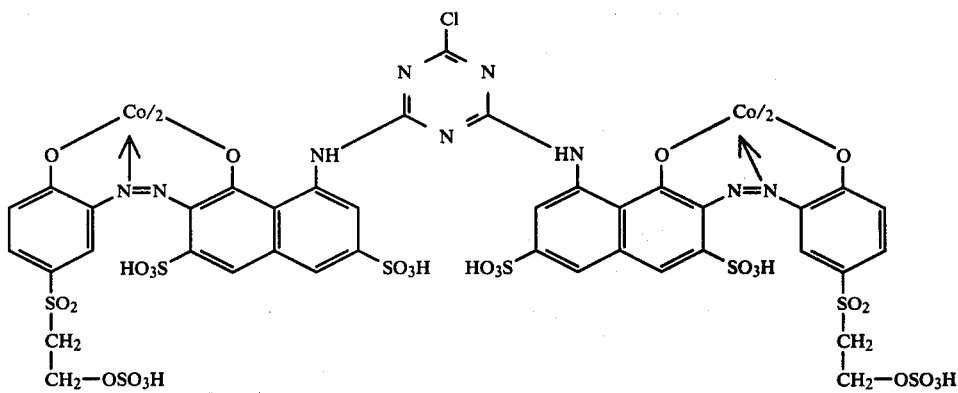

EXAMPLE 106

325 parts by weight of 2-methoxy-5-methylaniline-4-β-sulfatoethylsulfone are suspended in 1,500 parts by volume of water and 500 parts by weight of ice and dissolved by adding about 63 parts by weight of calcined sodium carbonate, the resulting pH being between 6.0 and 6.5. 203 parts by volume of aqueous 5N sodium nitrite solution and 15 parts by weight of kieselguhr are added and the solution is clarified. The filtrate runs at 0°–5° C. into a mixture of 1,500 parts by weight of ice and 282 parts by weight of aqueous 31% strength hydrochloric acid. After stirring for one hour at 0°–5° C., a little excess nitrous acid is destroyed with amidosulfonic acid and the pH of the resulting diazonium salt solution is then adjusted to 6 by introducing about 40 parts by weight of sodium bicarbonate. This solution is coupled with the coupling solution described in Example 1. Coupling is carried out at 18°–20° C. for several hours, the pH value being kept at 5.3–6.1 by adding a blue-black powder which in the presence of acid-binding agents cellulose materials in reddish-tinged blue shades. In the form of the free acid, the dyestuff has the following constitution:

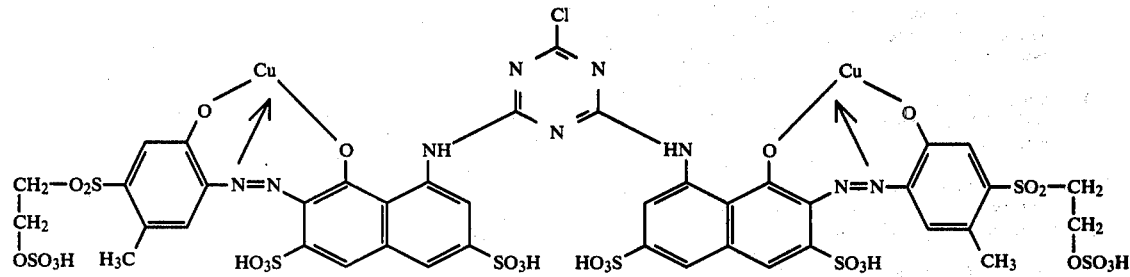

sodium bicarbonate in portions. When the coupling reaction has ended, a solution of 346 parts by weight of crystalline copper sulfate, 483 parts by weight of crystalline sodium acetate and 318 parts by weight of glacial acetic acid in 1,475 parts by volume of water is added and the mixture is then boiled under reflux for 18 hours. After cooling, the dyestuff solution is clarified and the dyestuff is then precipitated by adding potassium chloride, filtered off and dried in vacuo at 60° C. This gives The heavy metal complex dyestuffs listed in the table which follows can be obtained in a manner similar to that described in Examples 101 to 106. In the "diazo component" column, these components are described in the form in which they exist after metallization, that is to say in some cases with a hydroxy group formed from a methoxy group by demethylating metallization or with a hydroxy group introduced by oxidative coppering.

TABLE 2

| Example No. | Diazo component | Coupling component | Complex-forming metal | Color shade on cotton |
|---|---|---|---|---|
| 107 | 2 moles of 2-aminophenol-5-β-sulfatoethylsulfone | condensation product of 1 mole of cyanuric chloride and 2 moles of 1-amino-8-naphthol-3,6-disulfonic acid | chromium | bluish-tinged grey |
| 108 | 2 moles of 2-aminophenol-5-β-sulfatoethylsulfone | condensation product of 1 mole of cyanuric chloride and 2 moles of 1-amino-8-naphthol-3,6-disulfonic acid | cobalt | violet-tinged grey |
| 109 | 2 moles of 6-bromo-2-aminophenol-4-β-sulfatoethylsulfone | condensation product of 1 mole of cyanuric chloride and 2 moles of 1-amino-8-naphthol-3,6-disulfonic acid | copper | violet |
| 110 | 2 moles of 6-bromo-2-aminophenol-4-β-sulfatoethylsulfone | condensation product of 1 mole of cyanuric chloride and 2 moles of 1-amino-8-naphthol-3,6-disulfonic acid | chromium | reddish-tinged grey |
| 111 | 2 moles of 6-bromo-2-aminophenol-4-β-sulfatoethylsulfone | condensation product of 1 mole of cyanuric chloride and 2 moles of 1-amino-8-naphthol-3,6-disulfonic acid | cobalt | opaque violet |
| 112 | 2 moles of 6-nitro-2-aminophenol-4-β-sulfatoethylsulfone | condensation product of 1 mole of cyanuric chloride and 2 moles of 1-amino-8-naphthol-3,6-disulfonic acid | copper | violet |
| 113 | 2 moles of 6-nitro-2-aminophenol-4-β-sulfatoethylsulfone | condensation product of 1 mole of cyanuric chloride and 2 moles of 1-amino-8-naphthol-3,6-disulfonic acid | chromium | grey |
| 114 | 2 moles of 6-nitro-2-aminophenol-4-β-sulfatoethylsulfone | condensation product of 1 mole of cyanuric chloride and 2 moles of 1-amino-8-naphthol-3,6-disulfonic acid | cobalt | grey |
| 115 | 2 moles of 4-methyl-2-aminophenol-5-β-sulfatoethylsulfone | condensation product of 1 mole of cyanuric chloride and 2 moles of 1-amino-8-naphthol-3,6-disulfonic acid | chromium | bluish-tinged grey |
| 116 | 2 moles of 4-methyl-2-aminophenol-5-β-sulfatoethylsulfone | condensation product of 1 mole of cyanuric chloride and 2 moles of 1-amino-8-naphthol-3,6-disulfonic acid | cobalt | violet-tinged grey |
| 117 | 2 moles of 4-methoxy-2-aminophenol-5-β-sulfatoethylsulfone | condensation product of 1 mole of cyanuric chloride and 2 moles of 1-amino-8-naphthol-3,6-disulfonic acid | copper | reddish-tinged blue |
| 118 | 2 moles of 4-β-sulfatoethylsulfonyl-2-aminophenol-6-sulfonic acid | condensation product of 1 mole of cyanuric chloride and 2 moles of 1-amino-8-naphthol- | copper | violet |

TABLE 2-continued

| Example No. | Diazo component | Coupling component | Complex-forming metal | Color shade on cotton |
|---|---|---|---|---|
| 119 | 2 moles of 4-β-sulfatoethyl-sulfonyl-2-aminophenol-6-sulfonic acid | condensation product of 1 mole of cyanuric chloride and 2 moles of 1-amino-8-naphthol-3,6-disulfonic acid | chromium | reddish-tinged grey |
| 120 | 2 moles of 4-β-sulfatoethyl-sulfonyl-2-aminophenol-6-sulfonic acid | condensation product of 1 mole of cyanuric chloride and 2 moles of 1-amino-8-naphthol-3,6-disulfonic acid | cobalt | opaque violet |
| 121 | 2 moles of 8-β-sulfatoethyl-sulfonyl-1-hydroxy-2-amino-naphthalene-6-sulfonic acid | condensation product of 1 mole of cyanuric chloride and 2 moles of 1-amino-8-naphthol-3,6-disulfonic acid | copper | reddish-tinged blue |
| 122 | 2 moles of 2-aminophenol 4-β-sulfatoethylsulfone | condensation product of 1 mole of cyanuric chloride and 2 moles of 1-amino-8-naphthol-4,6-disulfonic acid | copper | violet |
| 123 | 2 moles of 2-aminophenol-4-β-sulfatoethylsulfone | condensation product of 1 mole of cyanuric chloride and 2 moles of 1-amino-8-naphthol-4,6-disulfonic acid | chromium | reddish-tinged grey |
| 124 | 2 moles of 2-aminophenol 4-β-sulfatoethylsulfone | condensation product of 1 mole of cyanuric chloride and 2 moles of 1-amino-8-naphthol-4,6-disulfonic acid | cobalt | opaque violet |
| 125 | 2 moles of 2-aminophenol-5-β-sulfatoethylsulfone | condensation product of 1 mole of cyanuric chloride and 2 moles of 1-amino-8-naphthol-4,6-disulfonic acid | copper | violet |
| 126 | 2 moles of 2-aminophenol-5-β-sulfatoethylsulfone | condensation product of 1 mole of cyanuric chloride and 2 moles of of 1-amino-8-naphthol-4,6-disulfonic acid | chromium | bluish-tinged grey |
| 127 | 2 moles of 2-aminophenol-5-β-sulfatoethylsulfone | condensation product of 1 mole of cyanuric chloride and 2 moles of 1-amino-8-naphthol-4,6-disulfonic acid | cobalt | violet-tinged grey |
| 128 | 2 moles of 6-chloro-2-amino-phenol-4-β-sulfatoethylsulfone | condensation product of 1 mole of cyanuric chloride and 2 moles of 1-amino-8-naphthol-4,6-disulfonic acid | copper | violet |
| 129 | 2 moles of 6-chloro-2-amino-phenol-4-β-sulfatoethylsulfone | condensation product of 1 mole of cyanuric chloride and 2 moles of 1-amino-8-naphthol-4,6-disulfonic acid | chromium | reddish-tinged grey |
| 130 | 2 moles of 6-chloro-2-amino-phenol-4-β-sulfatoethylsulfone | condensation product of 1 mole of cyanuric chloride and 2 moles of 1-amino-8-naphthol-4,6-disulfonic acid | cobalt | opaque violet |
| 131 | 2 mols of 2-aminophenol-4-β-sulfatoethylsulfone | condensation product of 1 mole of cyanuric chloride and 1 mole of 1-amino-8-naphthol-3,6-disulfonic acid and 1 mole of 1-amino-8-naphthol-4,6-disulfonic acid | copper | violet |
| 132 | 2 mols of 2-aminophenol-4-β-sulfatoethylsulfone | condensation product of 1 mole of cyanuric chloride and 1 mole of 1-amino-8-naphthol-3,6-disulfonic acid and 1 mole of 1-amino-8-naphthol-4,6-disulfonic acid | chromium | reddish-tinged grey |
| 133 | 2 mols of 2-aminophenol-4-β-sulfatoethylsulfone | condensation product of 1 mole of cyanuric chloride and 1 mole of 1-amino-8-naphthol-3,6-disulfonic acid and 1 mole of 1-amino-8-naphthol-4,6-disulfonic acid | cobalt | violet |
| 134 | 2 moles of 2-aminophenol-5-β-sulfatoethylsulfone | condensation product of 1 mole of cyanuric chloride and 1 mole of 1-amino-8-naphthol-3,6-disulfonic acid and 1 mole of 1-amino-8-naphthol-4,6-disulfonic acid | copper | violet |
| 135 | 2 mols of 2-aminophenol-5-β-sulfatoethylsulfone | condensation product of 1 mole of cyanuric chloride and 1 mole of 1-amino-8-naphthol-3,6-disulfonic acid and 1 mole of 1-amino-8-naphthol-4,6-disulfonic acid | chromium | bluish-tinged grey |

TABLE 2-continued

| Example No. | Diazo component | Coupling component | Complex-forming metal | Color shade on cotton |
|---|---|---|---|---|
| 136 | 2 mols of 2-aminophenol-5-β-sulfatoethylsulfone | condensation product of 1 mole of cyanuric chloride and 1 mole of 1-amino-8-naphthol-3,6-disulfonic acid and 1 mole of 1-amino-8-naphthol-4,6-disulfonic | cobalt | violet-tinged grey |
| 137 | 2 moles of 8-β-sulfatoethyl-sulfonyl-1-hydroxy-2-amino-naphthalene-6-sulfonic acid | condensation product of 1 mole of cyanuric chloride and 1 mole of 1-amino-8-naphthol-3,6-disulfonic acid and 1 mole of 1-amino-8-naphthol-4,6-disulfonic acid | copper | reddish-tinged blue |
| 138 | 2 moles of 2-aminophenol-4-β-sulfatoethylsulfone | condensation product of 1 mole of cyanuric bromide and 2 moles of 1-amino-8-naphthol-3,6-disulfonic acid | copper | violet |
| 139 | 2 moles of 2-aminophenol-4-β-sulfatoethylsulfone | condensation product of 1 mole of cyanuric bromide and 2 moles of 1-amino-8-naphthol-3,6-disulfonic acid | chromium | reddish-tinged grey |
| 140 | 2 moles of 2-aminophenol-4-β-sulfatoethylsulfone | condensation product of 1 mole of cyanuric bromide and 2 moles of 1-amino-8-naphthol-3,6-disulfonic acid | cobalt | opaque violet |
| 141 | 2 moles of 2-aminophenol-5-β-sulfatoethylsulfone | condensation product of 1 mole of cyanuric bromide and 2 moles of 1-amino-8-naphthol-3,6-disulfonic acid | copper | violet |
| 142 | 2 moles of 2-aminophenol-5-β-sulfatoethylsulfone | condensation product of 1 mole of cyanuric bromide and 2 moles of 1-amino-8-naphthol-3,6-disulfonic acid | chromium | bluish-tinged grey |
| 143 | 2 moles of 2-aminophenol-5-β-sulfatoethylsulfone | condensation product of 1 mole of cyanuric bromide and 2 moles of 1-amino-8-naphthol-3,6-disulfonic acid | cobalt | violet-tinged grey |
| 144 | 2 moles of 8-β-sulfatoethyl-sulfonyl-1-hydroxy-2-amino-naphthalene-6-sulfonic acid | condensation product of 1 mole of cyanuric bromide and 2 moles of 1-amino-8-naphthol-3,6-disulfonic acid | copper | reddish-tinged blue |
| 145 | 2 moles of 2-aminophenol-4-β-sulfatoethylsulfone | condensation product of 1 mole of cyanuric bromide and 2 moles of 1-amino-8-naphthol-4,6-disulfonic acid | copper | violet |
| 146 | 2 moles of 2-aminophenol-4-β-sulfatoethylsulfone | condensation product of 1 mole of cyanuric bromide and 2 moles of 1-amino-8-naphthol-4,6-disulfonic acid | chromium | reddish-tinged grey |
| 147 | 2 moles of 2-aminophenol-4-β-sulfatoethylsulfone | condensation product of 1 mole of cyanuric bromide and 2 moles of 1-amino-8-naphthol-4,6-disulfonic acid | cobalt | opaque violet |
| 148 | 2 moles of 2-aminophenol 5-β-sulfatoethylsulfone | condensation product of 1 mole of cyanuric bromide and 2 moles of 1-amino-8-naphthol-4,6-disulfonic acid | copper | violet |
| 149 | 2 moles of 2-aminophenol-5-β-sulfatoethylsulfone | condensation product of 1 mole of cyanuric bromide and 2 moles of 1-amino-8-naphthol-4,6-disulfonic acid | chromium | bluish-tinged grey |
| 150 | 2 moles of 2-aminophenol-5-β-sulfatoethylsulfone | condensation product of 1 mole of cyanuric bromide and 2 moles of 1-amino-8-naphthol-4,6-disulfonic acid | cobalt | violet-tinged grey |
| 151 | 2 moles of 8-β-sulfatoethyl-sulfonyl-1-hydroxy-2-amino-napthalene-6-sulfonic acid | condensation product of 1 mole of cyanuric bromide and 2 moles of 1-amino-8-naphthol-4,6-disulfonic acid | copper | reddish-tinged blue |
| 152 | 2 moles of 2-aminophenol-4-β-sulfatoethylsulfone | condensation product of 1 mole of 2,4,6-trifluoro-1,3,5-triazine and 2 moles of 1-amino-8-naphthol-3,6-disulfonic acid | copper | violet |
| 153 | 2 moles of 2-aminophenol-4-β-sulfatoethylsulfone | condensation product of 1 mole of 2,4,6-trifluoro-1,3,5-triazine and 2 moles of 1-amino-8-naphthol-3,6-disulfonic acid | chromium | reddish-tinged grey |
| 154 | 2 moles of 2-aminophenol-4-β-sulfatoethylsulfone | condensation product of 1 mole of 2,4,6-trifluoro-1,3,5-triazine and 2 moles of 1-amino- | cobalt | violet |

TABLE 2-continued

| Example No. | Diazo component | Coupling component | Complex-forming metal | Color shade on cotton |
|---|---|---|---|---|
| 155 | 2 moles of 2-aminophenol-5-β-sulfatoethylsulfone | condensation product of 1 mole of 2,4,6-trifluoro-1,3,5-triazine and 2 moles of 1-amino-8-naphthol-3,6-disulfonic acid | copper | violet |
| 156 | 2 moles of 2-aminophenol-5-β-sulfatoethylsulfone | condensation product of 1 mole of 2,4,6-trifluoro-1,3,5-triazine and 2 moles of 1-amino-8-naphthol-3,6-disulfonic acid | chromium | bluish-tinged grey |
| 157 | 2 moles of 2-aminophenol-4-β-sulfatoethylsulfone | condensation product of 1 mole of 2,4,6-trifluoro-1,3,5-triazine and 2 moles of 1-amino-8-naphthol-3,6-disulfonic acid | cobalt | violet-tinged grey |
| 158 | 2 moles of 2-aminophenol 4-β-sulfatoethylsulfone | condensation product of 1 mole of 2,4,6-trifluoro-1,3,5-triazine and 2 moles of 1-amino-8-naphthol-4,6-disulfonic acid | copper | violet |
| 159 | 2 moles of 2-aminophenol-5-β-sulfatoethylsulfone | condensation product of 1 mole of 2,4,6-trifluoro-1,3,5-triazine and 2 moles of 1-amino-8-naphthol-4,6-disulfonic acid | copper | violet |
| 160 | 2 moles of 2-aminophenol-4-β-sulfatoethylsulfone | condensation product of 1 mole of 2,4,6-trifluoro-1,3,5-triazine and 1 mole of 1-amino-8-naphthol-3-6-disulfonic acid and 1 mole of 1-amino-8-naphthol-4,6-disulfonic acid | copper | violet |
| 161 | 2 moles of 2-aminophenol-5-β-sulfatoethylsulfone | condensation product of 1 mole of 2,4,6-trifluoro-1,3,5-triazine and 1 mole of 1-amino-8-naphthol-3-6-disulfonic acid and 1 mole of 1-amino-8-naphthol-4,6-disulfonic acid | copper | violet |

EXAMPLE 162

611 parts by weight of the dyestuff of the formula

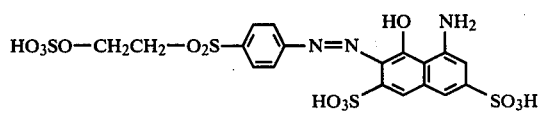

are dissolved in 3,500 parts by volume of water and the pH value of the solution is adjusted to 6.4–6.8. A solution of 92.25 parts by weight of cyanuric chloride in 300 parts by volume of acetone is then added dropwise to the dyestuff solution at 18°–21° C. and the resulting mixture is stirred for 15 minutes. The pH value of the reaction mixture is then adjusted to pH 6.4–6.8 by adding sodium bicarbonate, 150 parts by weight of sodium acetate are added and the mixture is then stirred for 1 hour at 55° C. The dyestuff solution is clarified and then spray-dried. This gives a red dyestuff powder, the properties of which correspond to those of the dyestuff described in Example 1. The formula of the dyestuff corresponds to that given in Example 1.

The dyestuffs listed in Examples 2 to 100 can also be prepared in a similar way.

EXAMPLE 163

689 parts by weight of the dyestuff of the formula

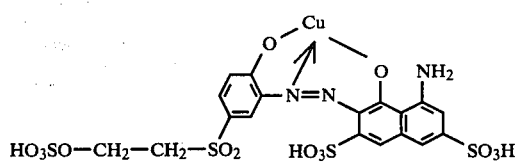

are dissolved in 6,000 parts by volume of water, the pH value being adjusted to 6.4–6.8 by adding a little sodium bicarbonate. A solution of 92.5 parts by weight of cyanuric chloride in 300 parts by volume of acetone is allowed to run into this dyestuff solution at 15°–25° C. and the resulting mixture is stirred for 30 minutes at the indicated temperature. The pH value of the reaction mixture is then again adjusted to 6.4–6.8 with a little sodium bicarbonate, 150 parts by weight of sodium acetate are added and the mixture is then stirred for 2 hours at 50°–55° C. It is then cooled again to 18°–20° C. and the dyestuff is precipitated by adding 1,200 parts by weight of potassium chloride, filtered off and dried in vacuo at 60° C. The properties and the constitution of the resulting dyestuff correspond to those of the dyestuff obtained according to Example 101.

The copper complex dyestuffs described in Example 102, 103 and 106 and those described in Table 2 can also be prepared in a similar way.

EXAMPLE 164

306 parts by weight of the dyestuff of the formula

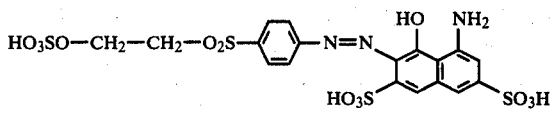

tion is clarified and spray-dried. This gives a red powder with which red dyeings and prints can be obtained on cotton in the presence of acid-binding agents. In the form of the free acid, the dyestuff has the following constitution:

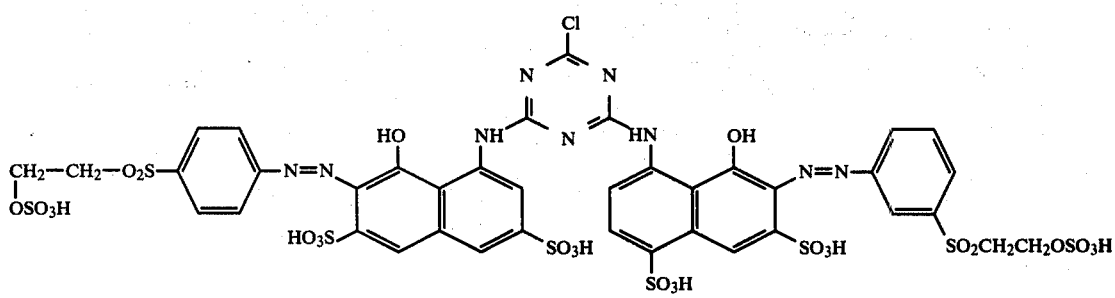

are dissolved in 2,000 parts by volume of water, the pH value of the solution is adjusted to 6.4–6.8 and a solution of 92.5 parts by weight of cyanuric chloride in 300 parts by volume of acetone is then allowed to run into the dyestuff solution. The reaction mixture is warmed to 35°–40° C. and kept at pH 6.3–6.7 for 1 hour by adding sodium bicarbonate in portions. A solution of 306 parts by weight of the dyestuff of the formula

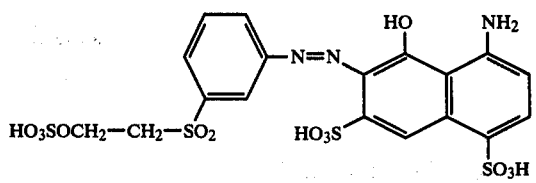

in 2,000 parts by volume of water, the pH of which has previously been adjusted to 6.4–6.8, is then added and the reaction mixture is warmed to 60°–65°, the pH value being kept at pH 6.3–6.7 by adding sodium bicarbonate in portions. When no further starting dyestuff can be detected in the paper chromatogram, the dyestuff solu-

EXAMPLE 165

If a solution of 344 parts by weight of the dyestuff of the formula

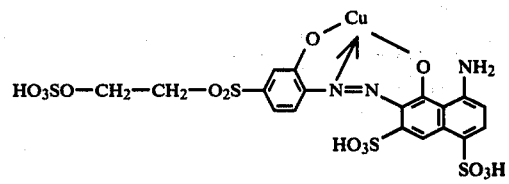

in 2,000 parts by volume of water is used in place of the second dyestuff solution in Example 164 and in other respects the same procedure is followed, this gives a violet dyestuff powder with which cotton can be dyed and printed in red-violet color shades. In the form of the free acid, the dyestuff has the following constitution:

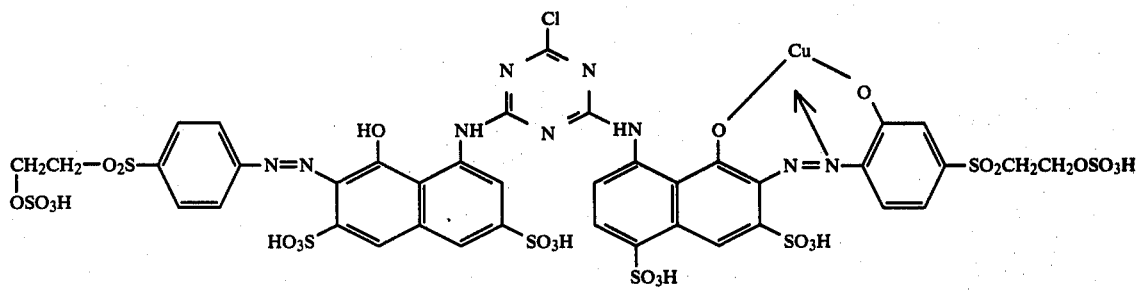

Dyestuffs which contain two different diazo components, for example those listed in Table 3, can be prepared in a controlled manner, by a method similar to that indicated in Examples 164 and 165:

TABLE 3

| Example No. | Structure | Color shade on cotton |
|---|---|---|
| 166 | | red |
| 167 | | claret |
| 168 | | reddish-tinged violet |
| 169 | | bluish-tinged red |
| 170 | | red |
| 171 | | red |

TABLE 3-continued

| Example No. | | Color shade on cotton |
|---|---|---|
| 172 | | claret |
| 173 | | red-violet |
| 174 | | red |

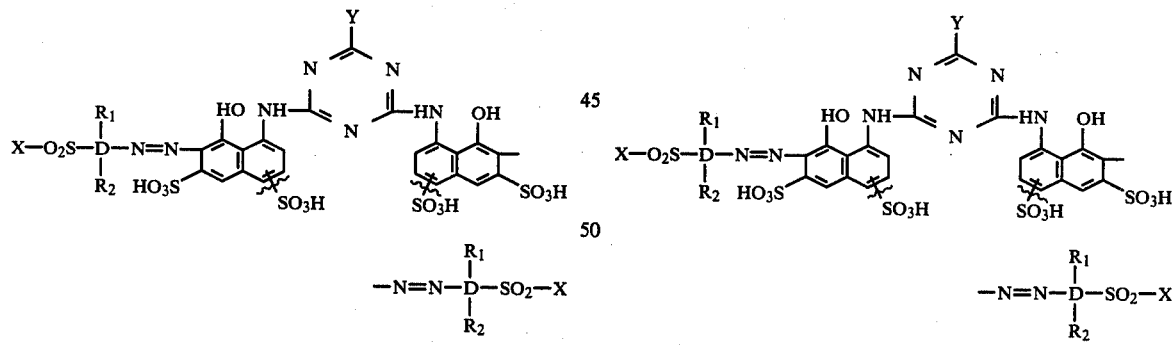

What is claimed is:

1. A water-soluble dyestuff which in the form of the free acid has the formula in which D is the benzene nucleus or the naphthalene nucleus;

$R_1$ is in the ortho-position relative to the azo group on D and is hydrogen, halogen, lower alkyl, lower alkoxy, hydroxy, carboxy or sulfo and $R_2$ is hydrogen, halogen, lower alkyl, lower alkoxy, nitro or sulfo, $R_1$ and $R_2$ being identical or different from one another;

X is β-thiosulfatoethyl, vinyl or β-sulfatoethyl; and Y is chlorine, fluorine or bromine.

2. A dyestuff according to claim 1 wherein Y is chlorine.

3. A water-soluble dyestuff which in the form of the free acid has the formula in which D is the benzene nucleus;

$R_1$ is in the ortho-position relative to the azo group on D and is hydrogen, halogen, lower alkyl, lower alkoxy, hydroxy, carboxy or sulfo and $R_2$ is hydrogen, halogen, lower alkyl, lower alkoxy, nitro or sulfo, $R_1$ and $R_2$ being identical or different from one another;

X is β-thiosulfatoethyl, vinyl or β-sulfatoethyl; and Y is chlorine.

4. A water-soluble dyestuff which in the form of the free acid has the formula

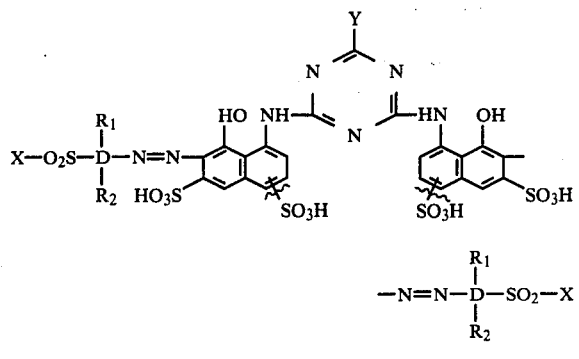

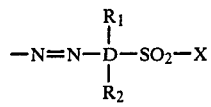

in which
- D is the naphthalene nucleus bonded in the 2-position to the azo group;
- R₁ is hydrogen and R₂ is sulfo in the 6-position of the naphthalene nucleus, or
- R₁ is sulfo and
- R₂ is hydrogen;
- X is 2-thiosulfatoethyl, vinyl or β-sulfatoethyl; and
- Y is chlorine.

5. A dyestuff according to claim 3, wherein —SO₂—X is in the meta-position or para-position relative to the azo group.

6. A dyestuff according to claim 4 wherein D contains the group —SO₂—X bonded in the 6-position or 8-position.

7. A dyestuff according to claim 3 or 4 or 5 or 6, wherein X is β-sulfatoethyl.

8. A water-soluble dyestuff which in the form of the free acid has the formula

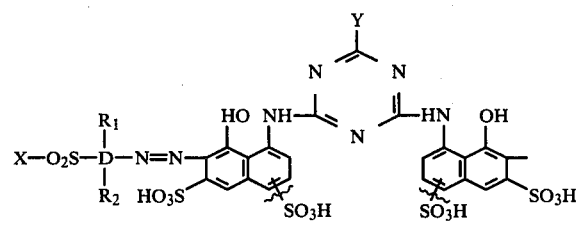

in which
- D is the benzene nucleus or the naphthalene nucleus;
- R₁ is in the ortho-position relative to the azo group on D and is hydrogen, halogen, lower alkyl, lower alkoxy, hydroxy, carboxy or sulfo and
- R₂ is hydrogen, halogen, lower alkyl, lower alkoxy, nitro or sulfo,
- R₁ and R₂ being identical or different from one another;
- X is β-sulfatoethyl; and
- Y is chlorine.

9. A water-soluble dyestuff which in the form of the free acid has the formula

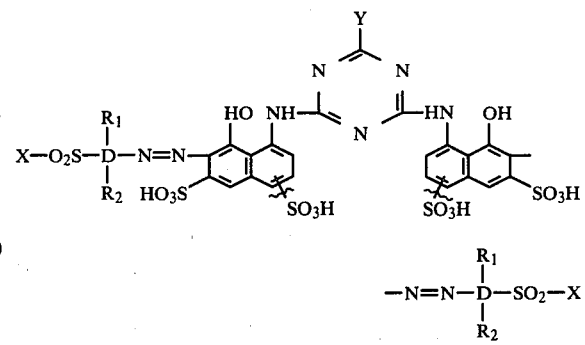

in which
- D is the benzene nucleus having the group —SO₂—X bonded in the para-position relative to the azo group;
- R₁ and R₂ are hydrogen;
- X is β-thiosulfatoethyl, vinyl or β-sulfatoethyl; and
- Y is chlorine.

10. A dyestuff according to claim 8 or 9, wherein in each case, one sulfo group in the aminonaphtholdisulfo radical is bonded in the meta-position relative to the amino group.

11. A dyestuff according to claim 9, in which, in each case, one sulfo group in the aminonaphthol radical is in the para-position relative to the amino group.

12. A water-soluble copper complex compound as recited in claim 1 wherein one or both of R₁ are hydroxy.

13. The dyestuff according to claim 1, which, in the form of the free-acid, has the formula

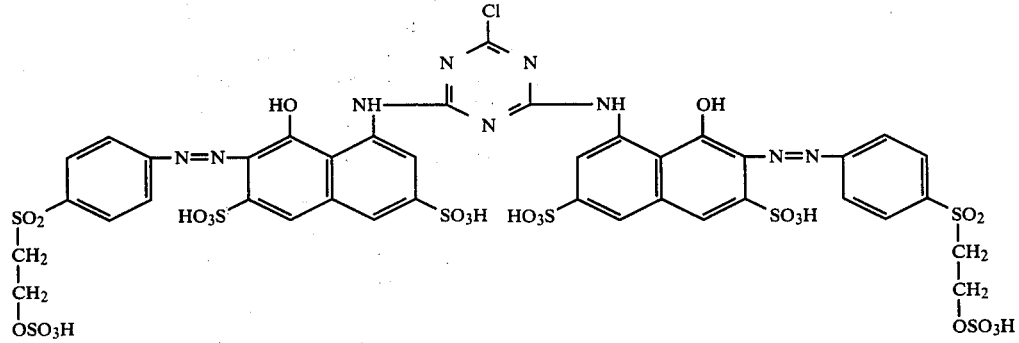

* * * * *